United States Patent
Saxena et al.

(10) Patent No.: US 12,353,318 B1
(45) Date of Patent: Jul. 8, 2025

(54) SYSTEMS, METHODS, AND MEDIA FOR AUTOMATICALLY AND DYNAMICALLY GENERATING AND EXECUTING CHAOS TESTING FOR DIFFERENT SOFTWARE APPLICATIONS EXECUTING IN A COMPUTING ENVIRONMENT

(71) Applicant: FMR LLC, Boston, MA (US)

(72) Inventors: Subhash Saxena, Miyapur (IN); Nitin Shirsat, Cary, NC (US); Srikara Uplady Manjunatha, Bengaluru (IN); Boris Kalinichenko, Jamaica Plain, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/982,417

(22) Filed: Dec. 16, 2024

(51) Int. Cl.
  *G06F 9/44* (2018.01)
  *G06F 11/3668* (2025.01)
(52) U.S. Cl.
  CPC .................. *G06F 11/3688* (2013.01)
(58) Field of Classification Search
  CPC .................................................. G06F 11/3688
  See application file for complete search history.

(56) References Cited

U.S. PATENT DOCUMENTS

| | | | | |
|---|---|---|---|---|
| 2011/0131451 | A1* | 6/2011 | Bosch | G06F 11/3672 714/33 |
| 2014/0143198 | A1* | 5/2014 | Snow | G06N 5/013 706/47 |
| 2019/0129833 | A1* | 5/2019 | Lv | G06N 5/02 |
| 2019/0213115 | A1* | 7/2019 | Takawale | G06F 11/3692 |
| 2025/0005162 | A1* | 5/2025 | Baker | G06F 11/3688 |

* cited by examiner

*Primary Examiner* — Hang Pan
(74) *Attorney, Agent, or Firm* — Cesari and McKenna, LLP

(57) ABSTRACT

Techniques are provided for automatically generating and executing chaos tests for different software applications in a computing environment. A chaos testing data structure can be generated based on an analysis of configuration and/or property files for the software application and/or hosting platform service provider. A pattern and other information from the chaos data structure can be used to determine a topology of the software application and determine defined paths to different identified potential points of failure. One or more components can be selected for the defined paths to the identified potential points of failure. A chaos test template can be selected and automatically populated for each selected component. One or more chaos tests can be executed using the populated chaos test templates to identify one or more vulnerabilities/weaknesses, determine one or more recommendations to improve the vulnerabilities/weaknesses, and/or automatically implement one or more remediations to improve the vulnerabilities/weaknesses.

20 Claims, 7 Drawing Sheets

400

APPLICATION CONFIGURATION  
Region: 'us-east-1'  
AccountID: '123456'  
Role: 'Admin'  
SoftwareApplicatoinID: 'APXX'  
deploymentName: DepNameVY'  
namespace: 'dev-environment'  
clusterName: 'ClusetrX-dev-us-east-1'  
labelKey: 'app'  
labelValue: 'automation'  
pattern: 'Type 1 Kubernetes'  
probesURL: 'http://www.default.com'  
} 405

PROPERTIES  
Tier: 'Tier-1'  
tps: '100ms '  
sla: '100ms'  
max_replica_processes: '4'  
min_replica_procsses: '4'  
cpu: '100m'  
memory: '128Mi'  
cpulimit: '100m'  
memorylimit: '128Mi'  
} 410

OPTIONAL PARAMETERS  
Failover: 'True'  
} 415

FIG. 4

| COMPONENT ANALYZER OUTPUT ||
|---|---|
| COMPONENTS | CONFIGURATION INFORMATION |
| REGION | TRANSACTION PER SECOND |
| ZONE | SERVICE LEVEL AGREEMENT |
| POD | MAXIMUM AND MINIMUM REPLICAS |
| NETWORK CONNECTIVITY | CPU |
| | MEMORY ALLOCATION |

FIG. 5

```
Config:
    ALPHA:
        Role: admin      ⎫
        Region: us-east-1 ⎬ 610
                         ⎭
    Chaos Provider: ChaosToolA    ) 625
    Hypothesis: Application should still run with degraded performance    ) 630
Experiment:
    Probes:
    - deployment-fully-available:         ⎫
        Namespace: dev-environment         ⎬ 620
        DeploymentName: DepNameYY         ⎭
    Methods:
    - PodKill:              ⎫
        Mode: fixed-percent ⎬
        Value: 72           ⎬ 605
        Length: 180         ⎭
    SoftwareApplicationID: APXX
Target:
    Type: Type 1 Kubernetes                    ⎫
    Namespace: dev-environment                 ⎬
    DeploymentName: DepNameYY                  ⎬
    ClusterName: ClusetrX-dev-us-east-1        ⎬ 615
    LabelKey: app                              ⎬
    LabelValue: automation                     ⎭
```

SYSTEMS, METHODS, AND MEDIA FOR AUTOMATICALLY AND DYNAMICALLY GENERATING AND EXECUTING CHAOS TESTING FOR DIFFERENT SOFTWARE APPLICATIONS EXECUTING IN A COMPUTING ENVIRONMENT

BACKGROUND

Technical Field

The present disclosure relates generally to electronic testing of software applications in a computing environment, and more specifically to techniques for automatically and dynamically generating and executing chaos tests for different software applications in a computing environment.

Background Information

Chaos testing involves intentionally simulating faults and stressful conditions in a computing environment that hosts a software application. This approach allows enterprises to proactively identify vulnerabilities and weaknesses within their systems, gaining valuable insights into how different components react under stress. By mimicking real-world disruptions—such as network outages, spikes in traffic, or database failures—enterprises can observe the behavior of their applications in challenging scenarios. This understanding is critical for assessing overall system resilience reliability.

One primary benefit of chaos testing is that it equips enterprises with the ability to implement safeguards and improvements before issues (e.g., real-world disruptions) arise in a production environment. By proactively addressing potential weaknesses and vulnerabilities, enterprises, i.e., organizations, can enhance their software applications' ability to function smoothly when stressful conditions are encountered. This not only leads to increased reliability and performance, but also results in increased customer confidence and satisfaction also cost reduction due to high availability and less outage of the system. Therefore, chaos testing is a valuable tool for enterprises to ensure that their software applications are continuously improving and adapting in the ever changing digital world that can include unpredictable disruptions.

Chaos testing, despite its significant benefits, can indeed be challenging to implement effectively. Meaningful chaos testing relies heavily on a deep understanding of the software application's architecture, potential vulnerabilities, and the interactions between different components in the host computing environment. For instance, to successfully carry out chaos testing, testers must know how various elements communicate, identify potential bottlenecks, and pinpoint areas that are particularly vulnerable to different types of failures. This comprehensive understanding is crucial for designing tests that accurately simulate real-world disruptions while minimizing the risk of adverse effects.

If testers lack sufficient information, they may inadvertently introduce chaos in ways that lead to unintended consequences, such as bugs in the software application or the software application going offline during or after testing. Such outcomes can disrupt the operation of the software application in the host computing environment, resulting in decreased reliability and performance. This, in turn, can erode customer confidence and satisfaction, undermining the very purpose of chaos testing, which is to enhance system resilience and ensure a seamless user experience even under stressful conditions.

SUMMARY

Techniques are provided for automatically generating and dynamically adapting and adjusting to the application state and executing chaos tests for different software applications in a computing environment.

Specifically, a processor (e.g., a processor executing a chaos testing module) may analyze configuration files and/or property files corresponding to a software application. In an embodiment, the software application may be hosted on remote devices of a platform service provider, wherein the remote devices may be cloud-based devices. Based on the analysis, the software application can generate a chaos testing data structure that includes a pattern utilized by the platform service provider and other information related to the operation of the software application and/or the characteristics of the platform service provider.

In an embodiment, the pattern may be a software application management service of a plurality of different software application management services that is used to manage the software applications that are hosted on the remote devices that are owned by the platform service provider. In an embodiment, the plurality of different software application management services include, but are not limited to, container orchestrated services (e.g., one or more different types of Kubernetes), serverless computing services (e.g., Lambda), virtual machine services (e.g., EC2), etc.

The processor may utilize the pattern and other information from the chaos data structure to understand, i.e., determine, the topology of the software application. The arrangement and interaction of underlying components that enable the operation of the software application in a desired manner may be referred to as the topology. The topology of the software application may encompass the behavior or expected behavior of the hosted software application and influences the performance, scalability, and reliability of the software application hosted by the platform service provider.

Based on understanding the topology of the software application, the processor can determine defined paths to different identified potential points of failure. The processor can then select one or more components for the defined paths to the identified potential points of failure. The processor may select a chaos test template for each selected component and dynamically populate each chaos test template with the necessary information using previously obtained information regarding the software application and/or the platform service provider.

The processor can then automatically execute one or more chaos tests using the populated chaos test templates to identify one or more vulnerabilities/weaknesses, determine one or more recommendations to improve the vulnerabilities/weaknesses, and/or automatically implement one or more remediations to improve the vulnerabilities/weaknesses.

BRIEF DESCRIPTION OF THE DRAWINGS

The description below refers to the accompanying drawings, of which:

FIG. 4 is an example chaos testing data structure generated according to the one or more embodiments as described herein;

FIG. 5 is an example component analyzer output according to the one or more embodiments as described herein;

FIG. 6 is an example populated pod kill chaos test template that is automatically generated according to the one or more embodiments as described herein.

DETAILED DESCRIPTION OF AN ILLUSTRATIVE EMBODIMENT

Figure 1:
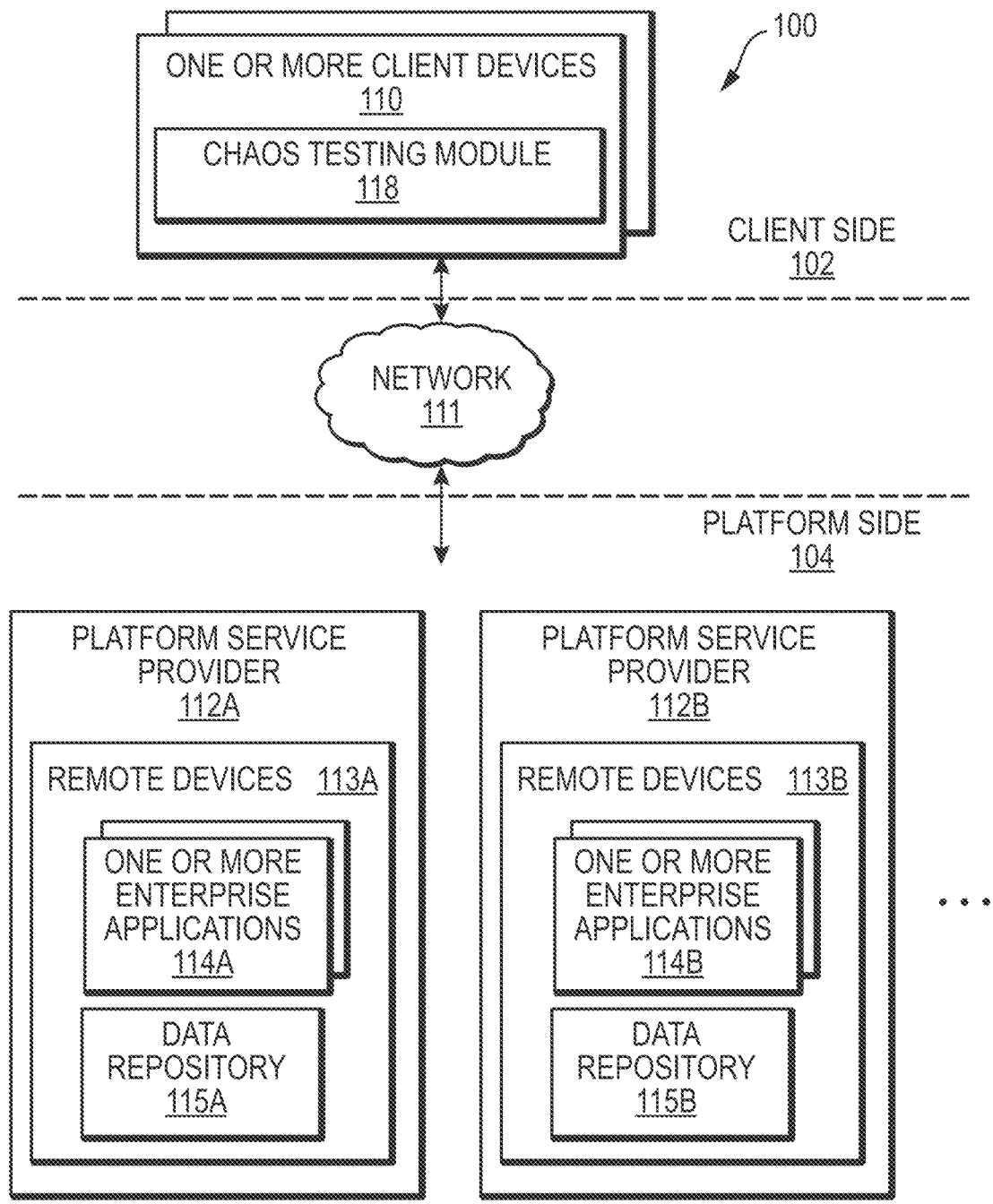
FIG. 1 is an example high-level block diagram of an example system environment according to one or more embodiments as described herein.

FIG. 1 is an example high-level block diagram of an example system environment 100 according to one or more embodiments as described herein. The system environment 100 may be divided into a client side 102 that includes one or more local client devices 110 that are local to end users, and a platform side 104 that includes one or a plurality of different platform service providers 112.

For simplicity and ease of understanding, the platform side 104 includes two platform service providers 112A and 112B. However, it should be expressly understood that the platform side 104 may include any number (e.g., one or more) of platform service providers 112, which is indicated with ellipsis in FIG. 1.

Each platform service provider 112 may own and manage its own remote devices 113. For the example of FIG. 1, platform service provider 112A owns and manages remote devices 113A and platform service provider 112B owns and manages remote devices 113B. The one or more remote devices 113 may be one or more cloud-based devices and/or one or more server devices. Remote devices 113 may host one or more enterprise software applications 114. For example, enterprise application 114A may be hosted on remote devices 113A that are owned and managed by platform service provider 112A. Similarly, enterprise applications 114B may be hosted on remote devices 113B that are owned and managed by platform service provider 112B. For simplicity and ease of understanding, enterprise software application 114 may be referred to as software application 114.

Additionally, the remote devices 113 may include data repository 115 that may store information relating to the software applications 114 hosted by the corresponding platform service provider. Moreover, data repository 115 may store data structures and/or information utilized and/or generated according to the one or more embodiments as described herein.

In an embodiment, an enterprise, which is a customer of platform service provider 112, may own and operate a software application 114 that is hosted on remote devices 113 of a platform service provider 112. The hosted software application 114 may be accessed by the enterprise (e.g., employees of the enterprise) and/or customers of the enterprise. In an embodiment, the software application 114 may be a financial services application. For example, an enterprise that is named Fintech Finance may host software application 114 on remote devices 113A of platform service provider 112A.

Each enterprise software application 114 may have a corresponding software architecture of a plurality of different software architectures. The plurality of different software architectures may include, but are not limited to, a microservices software architecture, a monolithic software architecture, a layered software architecture, an event-driven software architecture, and a serverless software architecture.

In an embodiment, platform service provider 112 may implement a software application management service, of a plurality of different software application management services, that is used to manage the software applications 114 that are hosted on the remote devices 113 that are owned by the platform service provider 112. In an embodiment, the plurality of different software application management services include, but are not limited to, container orchestrated services (e.g., one or more different types of Kubernetes), serverless computing services (e.g., Lambda), virtual machine services (e.g., EC2), etc. In an embodiment, the software application management service may be referred to as a pattern.

In an embodiment, various components interact and operate together to manage the execution and operation of hosted software applications 114 in adherence to software application management services, such as container orchestration services. The components may include, but are not limited to, load balancers, availability zones, regions, pods, and compute resources (e.g., virtual machines and databases).

Each hosted software application 114 can leverage one or more different components based on its specific operations and requirements. For example, load balancers optimize traffic distribution, while availability zones and regions enhance resilience and fault tolerance by providing redundancy and reducing latency. Consequently, different software applications 114 can utilize various components tailored to their unique implementation details. The arrangement and interaction of these components to enable the operation of the software application 114 in the desired manner may be referred to as a topology or a topology of the software application 114. The topology of the software application 114 encompasses the behavior or expected behavior of the hosted software application 114 and influences the performance, scalability, and reliability of the software application 114 hosted by the platform service provider 112.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of an enterprise. The client device 110 may also be operated by authorized personnel, e.g., employees of the enterprise, to perform enterprise functions. For example, a user, e.g., customer or authorized personnel of the enterprise, may utilize client device 110 to access enterprise applications 114 over network 111 to, for example, implement one or more application functions.

The client device 110 may include chaos testing module 118. Chaos testing module 118 may implement the one or more embodiments as described herein. In an embodiment, only authorized personnel of the enterprise can execute the chaos testing module 118 to implement the one or more embodiments as described herein. In an embodiment, the chaos testing module 118 may be software, hardware, or a combination of software and hardware.

As will be described in further detail below, the chaos testing module 118 may be executed to automatically and dynamically generate, for a hosted enterprise software application 114, a chaos test for each selected component that defines the topology of a software application 114 hosted on platform service provider 112. Based on the execution of each chaos test, the chaos testing module 118 may identify one or more vulnerabilities/weaknesses, determine one or more recommendations to improve the vulnerabilities/weaknesses, and/or automatically implement one or more remediations to improve the vulnerabilities/weaknesses.

Figure 2:
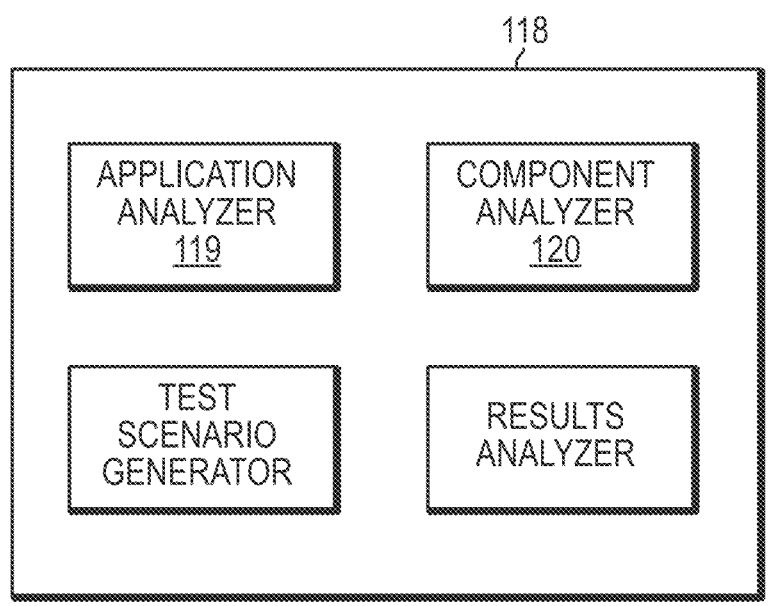
FIG. 2 is an example block diagram of a chaos testing module according to one or more embodiments as described herein.

FIG. 2 is an example block diagram of a chaos testing module 118 according to one or more embodiments as described herein. As will be described in further detail below, application analyzer 119, component analyzer 120, test scenario generator 121, and results analyzer 122 may, together, implement the one or more embodiments as described herein. In an embodiment, application analyzer 119, component analyzer 120, the test scenario generator 121, and results analyzer 122 may be software, hardware, or a combination of software and hardware.

Application analyzer 119 may analyze configuration files and/or property files, stored in data repository 112, that are associated with a software application 114 hosted on platform service provider 112. Based on the analysis, application analyzer 119 may identify, i.e., determine, a pattern and configuration information associated with the software application 114. Based on the identification, the application analyzer 119 may generate a chaos testing data structure, which includes the identified pattern and configuration information. Component analyzer 120 may use the chaos testing data structure 400 to determine (i.e., understand/deduce) the behavior and topology of the software application 114 to identify one or more potential points of failure. The component analyzer 120 can select components related to the potential points of failure for chaos testing.

The test scenario generator 121 may dynamically and automatically generate a chaos test for each selected component by automatically populating a chaos test template, for the selected component, using the corresponding configuration information obtained by application analyzer 119. The test scenario generator 121 may execute each generated chaos test to automatically test the vulnerabilities and/or weaknesses for the software application 114 at the various potential points of failure. The results analyzer 112 may evaluate the output from the executed chaos tests to identify vulnerabilities and/or weaknesses, determine potential recommendations to improve the vulnerabilities and/or weaknesses, and/or automatically implement remediations to address the identified vulnerabilities and/or weaknesses.

Therefore, the one or more embodiments as described herein can automatically and dynamically generate and execute different chaos tests for software applications 114 that have different operating parameters and that are required to adhere to different software management architectures, i.e., patterns. Because chaos tests can be automatically generated and executed for different operating parameters and/or software management architectures without requiring a deep understanding of the different software application factors (e.g., software application's architecture, potential vulnerabilities, and the interactions between different components in the host computing environment), less chaos testing errors are encountered when compared to conventional systems and approaches. Because the one or more embodiments as described herein result in fewer errors being introduced during electronic chaos testing when compared to conventional systems, the one or more embodiments as described herein provide an improvement in the existing technological field of electronic chaos testing.

Moreover, the chaos testing as described herein can analyze the topology of the software application 114 to generate a chaos test for the particular components that are identified as being related to potential points of failure. As a direct result, software applications 114 that utilize the chaos testing as described herein are more resilient and better suited to adapt to unpredictable real-world disruptions when compared to software applications that utilize conventional chaos testing. By ensuring that software applications 114 are more resilient and reliable, the one or more embodiments as described herein also provide an improvement in the existing technological field of software application testing. Further, because disruptions on the platform service provider 112 that host the software application 114 are mitigated, the one or more embodiments as described herein also provide an improvement to the underlying computer, e.g., platform service provider 112, itself.

Figure 3:
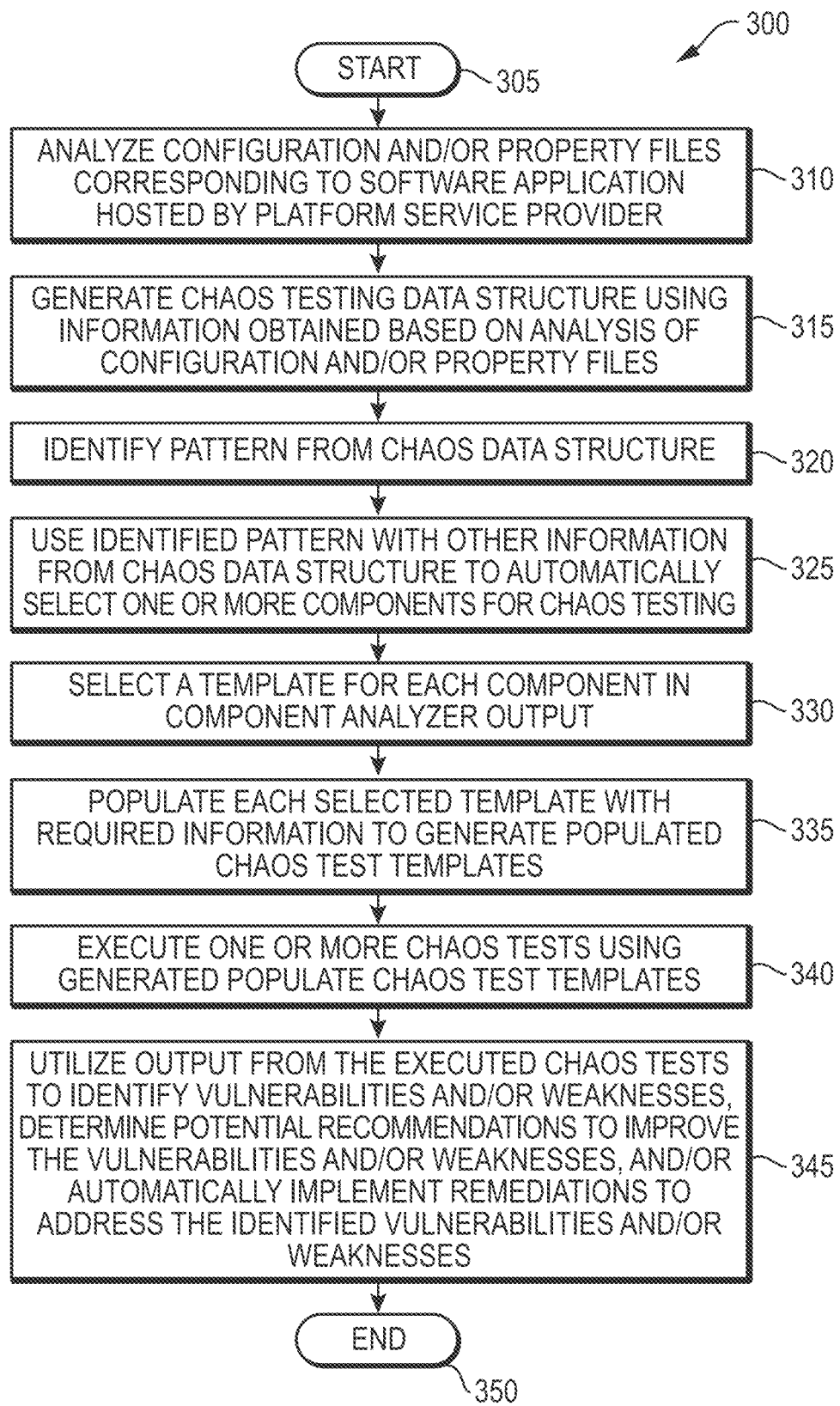
FIG. 3 is a flow diagram of a sequence of steps for automatically and dynamically generating and executing chaos tests for a software application hosted on a platform service provider.

FIG. 3 is a flow diagram of a sequence of steps for automatically and dynamically generating and executing chaos tests for a software application hosted on a platform service provider. Although the examples as described in relation to FIG. 3 may refer to a single application that is hosted by a particular platform service provider, it is expressly contemplated that the one or more embodiments as described herein may be implemented in parallel or sequentially for a plurality of different software applications that are hosted on a plurality of different platform service providers. As such, the examples as described in relation to the flow diagrams should be taken as illustrative only. Further, although reference may be made to the application analyzer 119, component analyzer 120, test scenarios generator 121, and results analyzer 122 each performing distinct functions, it is expressly contemplated that a single software module may implement all their functions.

Procedure 300 starts at step 305 and continues to step 310. At step 310, the chaos testing module 118 analyzes configuration and/or property files corresponding to a software application 114 hosted by a platform service provider 112. In an embodiment, the application analyzer 119 of the chaos testing module 118 analyzes the configuration and/or property files corresponding to the software application 114 hosted by the platform service provider 112. As an illustrative example, let it be assumed that platform service provider 112A of FIG. 1 is Alpha Web Services, which is a cloud computing platform that allows entities, e.g., individuals and/or enterprises, to host their software applications 114A on remote devices 113A, which are cloud computing devices.

For this example, let it be further assumed that one of software applications 114A hosted on remote devices 113A is a financial services application owned by enterprise Fintech Finance. That is, Fintech Finance's financial services application is managed and operated by Fintech Finance, but the financial services application is hosted on the remote devices 113 that are owned and managed by Alpha Web Services.

The application analyzer 119 may identify one or more data structures, corresponding to Fintech Finance's software application 114, that are stored in data repository 115A. For example, the application analyzer 119 may use a unique identifier that is assigned to Fintech Finance's software application 114 to identify the one or more corresponding data structures that are stored on data repository 115A.

After identifying the one or more data structures in the data repository 115A that corresponds to Fintech Finance's software application 114, the application analyzer 119 may syntactically analyze the one or more data structures to identify one or more field identifiers that store corresponding information to be extracted and used in the generation of a chaos testing data structure. In an embodiment, the application analyzer 119 may analyze the one or more data structures to identify the software architecture (e.g., microservices, monolithic) used by the software application 114.

The application analyzer 119 may then syntactically analyze the one or more data structures to identify particular fields of interest that are based on the software architecture. For example, the application analyzer 119 may identify different fields of interest for two different identified software architectures. That is, the type of software architecture may dictate which fields the application analyzer 119 identifies in the data structures. In an embodiment, and based on the software architecture, the application analyzer 119 may issue one or more commands to identify a particular field. For example, the application analyzer 119 may issue a deployment command to obtain the deployment name of "DepNameYY". Similarly, the application analyzer may issue a describe pods command to get information about the pods to obtain the label key and label value.

In an embodiment, the fields of interest may include, but are not limited to, a pattern filed, a tier field, a service level agreement (SLA) field, a transactions per second (TPS) (i.e., throughput), requests per second (RPS) (i.e., throughput), resource configuration information (e.g., processing requirements or limits, memory requirements or limits, maximum number of identical processes, a minimum number of identical processes, etc.), a regional location of the remote devices 113A that are hosting the financial services application, unique identifier of the financial services application, a unique identifier assigned to Fintech Finance, a deployment identifier, a namespace identifier, a cluster name identifier, etc.

For each identified field of interest, the application analyzer 119 may extract/obtain the corresponding data value. For example, the field identifier for the tier of the application may be "tier". The application analyzer 119 may syntactically analyze the one or more data structures, corresponding to Fintech Finance's software application 114, and identify the tier field. Based on the identification of the tier field, the application analyzer 119 may extract/obtain the corresponding value to obtain information indicating the tier of the software application 114. The tier (e.g., Tier-0, Tier-1, Tier-2, Tier-3, etc.) of a software application 114 may represent the criticality and importance of the software application 114 in terms of availability, reliability, performance, etc.

The application analyzer 119 may operate in a similar manner to identify other fields of interest and extract/obtain the corresponding information related to the configuration and/or properties of software application 114.

The procedure 300 may then continue from step 310 to step 315. At step 315, the chaos testing module 118 generates a chaos testing data structure using the information that is obtained/extracted based on the analysis of the configuration and/or property files as described in relation to step 310. In an embodiment, the application analyzer 119 of the chaos testing module 118 generates the chaos testing data structure.

FIG. 4 is an example chaos testing data structure generated according to the one or more embodiments as described herein. As depicted in FIG. 4, chaos testing data structure 400 includes a plurality of different fields and corresponding values. Specifically, and as depicted in FIG. 4, chaos testing data structure 400 includes a first section 405 titled application configuration, a second section 410 titled properties, and a third section 415 titled optional parameters. First section 405 that is titled application configuration, may describe the deployment (e.g., name, region, etc.) characteristics of the software application 114. Section 410, which is titled properties, may describe the operational properties and/or operational requirements of the software application 114.

Section 415, which is titled optional parameters, may describe optional parameters, such as whether failover should be implemented in the event of a failure. In an embodiment, if the tier of the software application 114 is Tier-0, the failover value is always true.

As will be described in further detail below, the configuration data and properties data may be utilized to automatically and dynamically generate and execute a chaos test for each of a plurality of different components corresponding to pre-defined path to a potential failure point.

In an embodiment, the plurality of different fields of chaos test data structure 400 may correspond to the field names that are syntactically identified in step 310. Additionally, each of the plurality of different fields of chaos test data structure 400 includes a corresponding obtained/extracted value. For example, the chaos test data structure 400, which is generated by application analyzer 119, includes a pattern field. Additionally, chaos test data structure 400 includes the value of "Type 1 Kubernetes" adjacent to the pattern field. As such, the chaos test data structure 400 indicates that the Fintech Finance software application 114 is deployed on remote devices 113 of a platform service provider 112 that utilizes the "Type 1 Kubernetes" software management service.

As depicted in FIG. 4, the chaos test data structure 400 includes other fields and corresponding values based on the other data extracted/obtained at step 310 as described above. In an embodiment, chaos test data structure 400 may be stored in data repository 115. As will be described in further detail below, the information stored in chaos test data structure 400 may be utilized to determine a topology of the software application 114 to identify one or more potential points of failure and the components related to the identified points of failure. As a result, and as will be described in further detail below, a chaos test for each identified component can be automatically and dynamically generated and executed to simulate real-world disruptions and evaluate potential vulnerabilities and/or weaknesses related to the operation of the financial services application.

Referring back to FIG. 3, the procedure 300 continues from step 315 to step 320. At step 320, chaos testing module 118 identifies a pattern from the chaos testing data structure 400. In an embodiment, component analyzer 120 of the chaos testing module 118 receives the chaos testing data structure 400 from application analyzer 119 and identifies the pattern.

For example, component analyzer 120 may syntactically analyze the chaos testing data structure 400 to identify the pattern field. The component analyzer 120 may then identify the corresponding pattern value. For this example, let it be assumed that component analyzer 120 determines that the pattern from chaos testing data structure 400 is "Type 1 Kubernetes".

The procedure continues from step 320 to step 325. At step 325, chaos testing module 118 uses the identified pattern with other information from the chaos testing data structure 400 to automatically select one or more components for chaos testing. In an embodiment, component analyzer 120 uses the identified pattern with other information from the chaos testing data structure 400 to automatically select one or more components for chaos testing.

The component analyzer 120 may analyze the topology of the software application 114 based on the information in the obtained chaos testing data structure 400. For example, the component analyzer 120 may utilize the identified pattern, e.g., Type 1 Kubernetes, to access repository 115 to identify a corresponding pattern data structure. The pattern data structure may store a static list of components that are utilized by the software application 114. As will be described in further detail below, the one or more embodiments as described herein can, based on the analysis of the topology, select one or more components from the static list for automatic chaos testing generation and execution.

As an example, let it be assumed that the static list of components for Type 1 Kubernetes for software application 114 is as follows:
1. Domain Name System (DNS)
2. Application load balancer (ALB)
3. Application Certificate Manager (ACM)
4. Region (Cloud region)
5. Zone (Availability Zone)
6. Node (EKS node)
7. Pod (EKS Pod or container)
8. KMS (Key management Service)
9. SMS (Secrets management Service)
10. VPC Peering
11. Database (External dependencies)
12. Secrets Manager
13. Network boundaries In an embodiment, component analyzer 120 may utilize the information from the chaos testing data structure 400 together with the list of components to understand the topology of the software application 114. That is, component analyzer 120 utilizes the information from the chaos testing data structure 400 together with the list of components to understand the behavior or expected behavior of the hosted software application 114, and, specifically, understand the behavior of the components utilized by the software application 114. For example, the chaos testing data structure 400 may indicate that the tier of the software application 114 is Tier-0. As a result, the component analyzer 120 may determine that the software application 114 uses a failover technique and thus requires the use of availability zone component and region component to test a failure scenario if, for example, there is a failure in an availability zone and/or region.

Accordingly, the information from the chaos testing data structure 400 can be utilized by component analyzer 120 to identify a pre-defined path to one or more potential points of failure for the software application 114 and based on the topology (i.e., understood topology) of the software application 114. Specifically, and in this example, component analyzer 120 determines that there is a pre-defined path, utilizing the zone component and the region component, to test a potential point of failure if the failover technique is not performed or not performed efficiently. As a result, component analyzer 120 determines that to test this pre-defined path to the potential point of failure, the availability zone component and the region component are required to perform chaos testing for this potential point of failure.

As a different example, consider a serverless function where an event triggers the flow of the serverless function. In turn, the function can perform a lookup for input data from a database or a different service to perform logical operations on the input data that can then be stored in the database. The component analyzer 120 may determine that there is a pre-defined path of components for this described workflow and can also determine other requirements (e.g., memory, processing, power, runtime, network connectivity, etc.) and test for a potential failure (e.g., misconfigured memory). Thus, the component analyzer 120 can determine the required components to perform chaos testing for potential points of failure with a serverless function.

Component analyzer 120 may identify other components in the static list for other potential points of failure using the information from the chaos testing data structure 400 in a similar manner as described herein. Therefore, and according to the one or more embodiments as described herein, component analyzer can determine the topology of the software application 114 to identify different pre-defined paths to failure points for chaos testing, and then identify the related/required components.

Thus, the component analyzer 120 can utilize the identified pattern with the other information in the chaos data structure to determine the behavior or expected behavior and which components are necessary for testing weaknesses/vulnerabilities. Additionally, and based on the analysis of the pattern and the other information of the chaos testing data structure 400, the component analyzer 120 can determine which components are not needed for chaos testing. That is, the component analyzer 120 can understand the topology of the software application 114, from the information in the chaos data structure 400 and static list of components, to identify those components that are needed and are not needed to test different vulnerabilities/weaknesses using pre-defined paths to potential points of failure.

For this example, let it be assumed that the component analyzer 120 determines that the region component, zone component, node component, pod component, and network connectivity are needed to test different pre-defined paths to different potential points of failure for chaos testing. Thus, and in this example, the other components, such as the secret manager component, are not utilized for the chaos testing generation and execution according to the one or more embodiments as described herein.

FIG. 5 is an example component analyzer output according to the one or more embodiments as described herein. As depicted in FIG. 5, the component analyzer output 500 includes section 505 that lists the components selected ins step 325 for chaos testing. Additionally, the component analyzer output 500 includes section 510 that includes the information, from chaos testing data structure 400, that may be related to each selected component in section 510. As will be described in further detail below, the component analyzer output 500 can be utilized to automatically and dynamically generate chaos tests that can be executed to test one or more vulnerabilities/weakness associated with software application 114.

Returning to FIG. 3, the procedure continues from step 325 to step 330. At step 330, the chaos testing module 118 selects a test template for each component in the component analyzer output. In an embodiment, the test scenario generator 121 of the chaos testing module 118 selects a test template for each component in the component analyzer output. In an embodiment, the test scenario generator 121 may access a chaos test template repository stored on remote devices 113A. The test template repository may store a chaos test template for each of a plurality of different viable components that may be used by software application 114. However, the test scenario generator 121 may select only those test templates for the components selected and included in component analyzer output 500. In an embodiment, the test scenario generator 121 may utilize the name of the selected component in the component analyzer output 500 to index into the test template repository to select a template for each selected component.

As depicted in FIG. 5, the component analyzer output 500 includes the selected components of: region component, zone component, node component, pod component, and network connectivity. Therefore, and for this example, the test scenario generator 121 selects a test template for each of these selected components.

After selecting a test template for each of the selected components at step 330, the procedure continues to step 335. At step 335, the chaos testing module 118 populates each selected test template with the required information to generate populated chaos test templates. In an embodiment, the test scenario generator 121 populates each selected template with the required information. Specifically, the test scenario generator 121 may populate each selected template with (1) information obtained by application analyzer 119, (2) the configuration information and/or property information included in component analyzer output 500, and/or (3) an identifier/value calculated or determined based on the configuration information and/or property information.

As an example, let it be assumed that the test scenario generator 121 selects a pod kill test template. A pod kill test is a technique utilized to test resilience, fault, tolerance, and self-healing capabilities of software application 114 in a Kubernetes environment. To that end, the pod kill test involves deliberately terminating (i.e., "killing") one or more pods in the Kubernetes environment to observe how the system (e.g., software application 114 and the platform service provider resources used by the software application) behaves/reactions and how it recovers from the failure of the pods.

For this example, the pod kill test template includes a mode field, a value field, and a length field. The mode field may define how pods are selected for termination during chaos testing to evaluate the system's resilience. For example, random or targeted pods may be killed to simulate different real-world disruptions. Common types of pod kill modes include, but are not limited to, random pod kill (e.g., any pod is randomly selected and termination), fixed pod kill (e.g., specific predetermined number of pods are terminated), fixed-percentage pod kill (e.g., specific percentage of pods are terminated), kill all pods (e.g., where all pods are terminated), etc.

The value field may indicate a number of pods to terminate. For example, the number of pods to kill may be an integer value (e.g., 4) or may be a percentage value such as 50%, indicating that half of the available pods should be termination. The length field may indicate a duration for the pod kill test. For example, the length may be 180 seconds, which would indicate that the pods will be terminated over a period of 180 seconds (e.g., 3 minutes).

According to the one or more embodiments as described herein, the tier of the software application (e.g., Tier-0, Tier-1, Tier-2, or Tier-3) may be utilized by test scenario generator 121 to automatically populate the mode, value, and length fields. For example, if the tier of the software application 114 is Tier-0 or Tier-1, the test scenario generator 121 may determine that the mode should be "fixed-percent". However, if the tier of the software application 114 is Tier-2 or Tier-3, the test scenario generator 121 may determine that the mode should be "fixed" (e.g., a predetermined number).

Moreover, the test scenario generator 121 may calculate the value, for the value field, as follows:

value=(min_replica+(max_replica−min_replica))*0.6 (Constant), where min_replica represents the minimum number of processes (e.g. pods), which in this example is a value of 4; max_replica represents the maximum number of processes (e.g., pods), which in this example is a value of 4; and constant is a constant value that is selected based on the tier of the software application 114. For example, let it be assumed that for a Tier-1 software application 114, the constant is 30. Accordingly, and in this example, the test scenario generator 121 may calculate the value as 72, e.g., (4+(4−4))*0.6(30).

The test scenario generator 121 may also determine that Tier-0 and Tier-1 software applications 114 should have a length of 180 seconds (three minutes), while Tier-2 and Tier-3 software applications 114 should have a length of 60 seconds (1 minute).

The test scenario generator 121 may calculate/determine values, in a similar manner, for any other required fields of other test templates that are selected for the components for the chaos testing according to the one or more embodiments as described herein.

Therefore, and in the example described herein, test scenario generator 121 selects and populates at least one test template, as described above, for each of the region component, zone component, node component, pod component, and network connectivity. Therefore, and according to the one or more embodiments as described herein, the test scenario generator 121 can automatically and dynamically generate a chaos test for each component selected by the component analyzer 120 based on the analysis of the topology of the software application 114 as described herein.

FIG. 6 is an example populated pod kill chaos test template that is automatically generated according to the one or more embodiments as described herein. Specifically, and in this example, the test scenario generator 121 may obtain the pod kill chaos test template (not shown) and populate the template with the required information, which may be obtained as described above, to generate the populated pod kill chaos test template 600. As depicted in FIG. 6, the populated pod kill chaos test template 600 includes the mode, value, and length fields in section 605 with parameters that are determined as described above and based on the tier of the software application 114.

Additionally, the populated pod kill chaos test template 600 includes other information in sections 610, 615, and 620. The other information is accessible to the test scenario generator 121, for generating the populated pod kill chaos test template 600, based on the execution of the application analyzer 119 that extracts the configuration information and or parameter information as described above in relation to step 310 of FIG. 3. The Chaos provider in line 625 may indicate the type of chaos testing tool that will be utilized to execute populated pod kill chaos test template 600 as described herein. In an embodiment, the chaos testing tool may be any of a variety of conventional chaos testing tools. The hypothesis in line 630 may indicate the expected behavior based on the execution of the populated pod kill chaos test template 600 that introduces the disruption by terminating 72% of the pods. In this example, the expected behavior is that the software application 114 will continue to run, i.e., execute and service requests, with degraded performance.

Accordingly, the test scenario generator 121 can automatically and dynamically generate populated pod kill chaos test template 600 that is populated using the chaos data structure generated by application analyzer 119 in relation to steps 310 and 315 of FIG. 3 and the component analyzer output 500 generated by the component analyzer 120 as described in relation to steps 320, 325, and 330 of FIG. 3.

Referring back to FIG. 3, the procedure continues from step 335 to step 340. At step 340, the chaos testing module 118 executes one or more chaos tests using the generated populated chaos test templates, e.g., populated pod kill chaos test template 600. In an embodiment, the test scenario generator 121 executes the one or more chaos tests. In an embodiment, the test scenario generator 121 may utilize a conventional chaos testing tool with the populated chaos test templates, which are generated according to the one or more embodiments as described herein. Based on the execution of the chaos tests, the test scenario generator 121 and/or the chaos testing tool may generate chaos test output that includes data indicating the response (i.e., behavior) of the system (e.g., software application 114 and the platform service provider resources used by the software application) during the chaos testing.

For example, the data may indicate how the software application 114 and the corresponding platform service provider resources behave when various real-world simulated failure scenarios are introduced. The behavior may provide insight into the system stability, error rate, performance metrics, recovery time, etc. For example, the output may indicate whether a behavior of the software application 114 is expected or not expected based on the configuration information (e.g., CPU/memory limit) and the pattern (e.g., Type 1 Kubernetes) used by the platform service provider 112 for executing/managing application 114. Returning to the example, the result data may indicate that the software application 114 continues to execute with degraded performance when 72% of the pods are intentionally terminated, or that the software application 114 fails to execute at all when 72% of the pods are intentionally terminated.

The procedure 300 continues from step 340 to step 345. At step 345, the chaos testing module 118 utilizes the output from the executed chaos tests to identify vulnerabilities and/or weaknesses, determine potential recommendations to improve the vulnerabilities and/or weaknesses, and/or automatically implement remediations to address the identified vulnerabilities and/or weaknesses. In an embodiment, the results analyzer 122 of the chaos testing module utilizes the output from the executed chaos test as described herein.

For example, let it be assumed that the result data indicates that the software application 114 did not behave as expected and the software application 114 went down when 72% of the pods are intentionally terminated. The result analyzer 122 may generate a report indicating that the software application 114 did not behave as expected and the report may be displayed on a computer display over client device 122. In addition or alternatively, the report may include one or more remediations that can be implemented so that the software application 114 will behave as expected. For this example, the remediation may be to implement a pod disruption budget (PDB) or a pod-affinity rule. The PDB may limit the number of pods that can be voluntarily disrupted (e.g., during node maintenance or cluster upgrades). It will ensure that a minimum number of pods remain available at all times to maintain availability of the software application 114 (e.g., even with degraded performance). The pod-affinity rule may determine where pods are scheduled in relation to other pods. The pod-affinity rule strategically places the pods for efficient execution based on specific requirements (e.g., failover). In an embodiment, the results analyzer 122 may automatically implement a determined remediation. In an embodiment, the one or more remediations may be obtained from different reports associated with different production environments according to the one or more embodiments as described herein.

Figure 7:
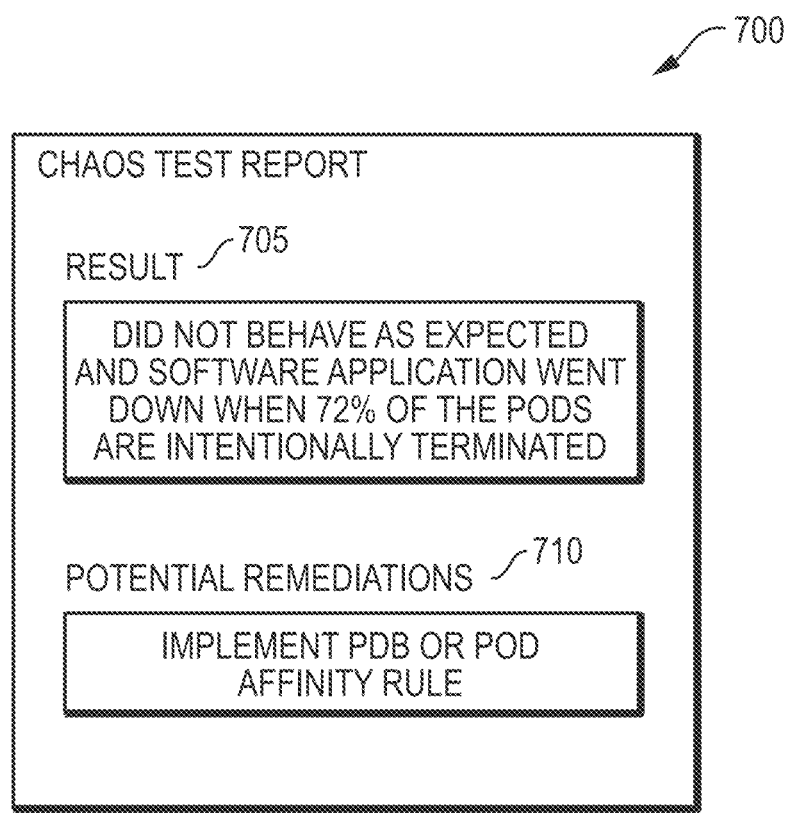
FIG. 7 is an example chaos test report that may be generated and displayed according to the one or more embodiments as described herein.

FIG. 7 is an example chaos test report that may be generated and displayed according to the one or more embodiments as described herein. The chaos test report 700 of FIG. 7 may be displayed in a graphical user interface on, for example, a display screen of client device 110. As depicted in FIG. 7, chaos test report 700 includes result section 705 that may display the results of the chaos testing as described herein. In this example, the result section 705 indicates that the software application 104 did not behave as expected and the software application 114 went down when 72% of the pods are intentionally terminated.

Additionally, the chaos test report 700 includes potential remediations section 710 that indicates one or more potential remediations that, for example, can address the unexpected behavior of the software application 104 that is determined based on the performance of the chaos testing according to the one or more embodiments as described herein. In this example, the potential remediations section 710 indicates that a PDB or a pod-affinity rule can be implemented to address the unexpected behavior of the software application 114.

By determining a remediation for software applications 114 in the manner described herein, the software application 114 can become more resilient when unpredictable disruptions are encountered. For example, by modifying the PDB or pod-affinity rule for software application 114, the next time there is an unpredictable pod failure, the software application 114 can continue to execute with degraded performance instead of failing to execute. Therefore, the one or more embodiments as described herein result in a more resilient software application 114, which is an improvement in the existing technological field of software application testing, e.g., software application chaos testing. Procedure 300 ends at step 350.

It should be understood that a wide variety of adaptations and modifications may be made to the techniques. For example, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computer implemented method for chaos testing for different software applications executing in a computing environment, the computer implemented method comprising:
analyzing, by a processor coupled to a memory of a computing device, one or more configuration or property data structures associated with an application having a software architecture, wherein the application can be implemented in the computing environment using a plurality of different patterns;
generating, based on the analysis and by the processor, a chaos testing data structure that includes at least (1) a pattern, of the plurality of different patterns, used by the computing environment for executing the application and (2) first configuration information for different parameters that define an operation and/or a performance of the application in the computing environment under one or more different conditions;
selecting, by the processor, a plurality of different components utilizing at least the pattern;
selecting, by the processor and for each of the plurality of different components, a chaos test template;
utilizing, by the processor, the first configuration information to populate a plurality of different fields in the chaos test template to generate a first executable chaos test for the application executing in the computing environment;
executing the first executable chaos test in the computing environment to test a defined path in the computing environment for a particular point of failure; and
generating, based on execution of the first executable chaos test, first chaos test output indicating whether a first behavior of the application at the particular point of failure is expected or not expected based on the first configuration information and the pattern used by the computing environment for executing the application.

2. The computer implemented method of claim 1, wherein the pattern is one of a container orchestration pattern, a virtual machine provisioning pattern, and an event-driven architecture pattern.

3. The computer implemented method of claim 2, wherein when the pattern is the container orchestration pattern, the application is a containerized application that is deployed and managed in the computing environment using Kubernetes.

4. The computer implemented method of claim 1, wherein the software architecture is one of a microservices software architecture, a monolithic software architecture, a layered software architecture, an event-driven software architecture, and a serverless software architecture.

5. The computer implemented of claim 1, further comprising:
analyzing, based on the pattern and a topology of the software application, one or more impacts corresponding to a plurality of different potential points of failure in the computing environment;
determining the plurality of different components utilizing the analysis of the one or more impacts corresponding to the plurality of different potential points of failure.

6. The computer implemented method of claim 1, wherein the first configuration information includes one or more of (1) a tier rating of the application defining criticality of a service provided by the application, (2) a response time of the application, (3) a number of transactions per second, (4) a number of requests per second, (5) processing requirements or limits allocated to a pod executing the application, (6) memory requirements or limits allocated to the pod executing the application, (7) a maximum number of identical pods executing the application, or (8) a minimum number of the identical pods executing the application.

7. The computer implemented method of claim 1, wherein the plurality of different components include two or more of (1) a domain name system (DNS) web service, (2) application load balancing service, (3) an application certificate manager service, (4) a regional geographical area that includes availability zones that are defined locations, (5) a particular availability zone, (6) a node located the particular availability zone, (7) a pod, which is an instance of a running process, that executes on the node to implement a function for the application, (8) a key management service, (9) a secrets management service, (10) a virtual private cloud peering service, (11) a database, and (12) network boundaries.

8. The computer implemented method of claim 1, further comprising:
utilizing second configuration information, which is different from the first configuration information, to populate the plurality of the different fields in the chaos test template to generate a second executable chaos test for the application executing in the computing environment;
executing the second executable chaos test in the computing environment to test the defined path in the computing environment for the particular point of failure; and
generating, based on execution of the second executable chaos test, second chaos test output, wherein
the first chaos test output indicates that the first behavior of the application at the particular point of failure is expected based on the first configuration information and the pattern used by the computing environment for executing the application, and
the second chaos test output indicates that a second behavior of the application at the particular point of failure is not expected based on the second configuration information and the pattern used by the computing environment for executing the application.

9. The computer implemented method of claim 1, further comprising:
determining that the first behavior of the application at the particular point of failure is not expected based on the first configuration information and the pattern used by the computing environment for executing the application; and
automatically modifying a characteristic of the application executing in the computing environment or automatically modifying a deployment characteristic of the computing environment.

10. The method of claim 9, further comprising:
re-executing, after the automatic modifying and utilizing updated first configuration information, the first executable chaos test in the computing environment to test the defined path in the computing environment for the particular point of failure; and
determining that the first behavior of the application at the particular point of failure is expected based on the updated first configuration information and the pattern used by the computing environment for executing the application.

11. A system for chaos testing for different software applications executing in a computing environment, the system comprising:

a processor coupled to a memory, the processor executing
a software module configured to:
analyze one or more configuration or property data structures associated with an application having a software architecture, wherein the application can be implemented in the computing environment using a plurality of different patterns;
generate, based on the analysis, a chaos testing data structure that includes (1) at least a pattern, of the plurality of different patterns, used by the computing environment for executing the application and (2) first configuration information for different parameters that define an operation and/or performance of the application in the computing environment under one or more different conditions;
select a plurality of different components utilizing at least the pattern;
select, for each of the plurality of different components, a chaos test template;
utilize the first configuration information to populate a plurality of different fields in the chaos test template to generate a first executable chaos test for the application executing in the computing environment;
execute the first executable chaos test in the computing environment to test a defined path in the computing environment for a particular point of failure; and
generate, based on execution of the first executable chaos test, first chaos test output indicating whether a first behavior of the application at the particular point of failure is expected or not expected based on the first configuration information and the pattern used by the computing environment for executing the application.

12. The system of claim 11, wherein the pattern is one of a container orchestration pattern, a virtual machine provisioning pattern, and an event-driven architecture pattern.

13. The system of claim 12, wherein when the pattern is the container orchestration pattern, the application is a containerized application that is deployed and managed in the computing environment using Kubernetes.

14. The system of claim 11, wherein the software architecture is one of a microservices software architecture, a monolithic software architecture, a layered software architecture, an event-driven software architecture, and a serverless software architecture.

15. The system of claim 11, wherein the software module is further configured to:
analyze, based on the pattern and a topology of the software application, one or more different impacts corresponding to a plurality of different potential points of failure in the computing environment;
determine the plurality of different components utilizing the analysis of the one or more different impact corresponding to the plurality of different potential points of failure.

16. The system of claim 11, wherein
the first configuration information includes one or more of (1) a tier rating of the application defining criticality of a service provided by the application, (2) a response time of the application, (3) a number of transactions per second, (4) a number of requests per second, (5) processing requirements or limits allocated to a pod executing the application, (6) memory requirements or limits allocated to the pod executing the application, (7) a maximum number of identical pods executing the application, or (8) a minimum number of the identical pods executing the application, or the plurality of different components include two or more of (1) a domain name system (DNS) web service, (2) an application load balancing service, (3) an application certificate manager service, (4) a regional geographical area that includes availability zones that are defined locations, (5) a particular availability zone, (6) a node located the particular availability zone, (7) a pod, which is an instance of a running process, that executes on the node to implement a function for the application, (8) a key management service, (9) a secrets management service, (10) a virtual private cloud peering service, (11) a database, and (12) network boundaries.

17. The system of claim 11, wherein the software module is further configured to:
utilize second configuration information, which is different from the first configuration information, to populate the plurality of the different fields in the chaos test template to generate a second executable chaos test for the application executing in the computing environment;
execute the second executable chaos test in the computing environment to test the defined path in the computing environment for the particular point of failure; and
generate, based on execution of the second executable chaos test, second chaos test output, wherein
the first chaos test output indicates that the first behavior of the application at the particular point of failure is expected based on the first configuration information and the pattern used by the computing environment for executing the application, and
the second chaos test output indicates that a second behavior of the application at the particular point of failure is not expected based on the second configuration information and the pattern used by the computing environment for executing the application.

18. The system of claim 11, wherein the software module is further configured to:
determine that the first behavior of the application at the particular point of failure is not expected based on the first configuration information and the pattern used by the computing environment for executing the application; and
automatically modify a characteristic of the application executing in the computing environment or automatically modify a deployment characteristic of the computing environment.

19. The system of claim 18, wherein the software module is further configured to:
re-execute, after the automatic modifying and utilizing updated first configuration information, the first executable chaos test in the computing environment to test the defined path in the computing environment for the particular point of failure; and
determine that the first behavior of the application at the particular point of failure is expected based on the updated first configuration information and the pattern used by the computing environment for executing the application.

20. A non-transitory computer readable medium having software encoded thereon, the software when executed by one or more computing devices operable to:
analyze one or more configuration or property data structures associated with an application having a software architecture, wherein the application can be implemented in a computing environment using a plurality of different patterns;

generate, based on the analysis, a chaos testing data structure that includes (1) at least a pattern, of the plurality of different patterns, used by the computing environment for executing the application and (2) first configuration information for different parameters that define an operation and/or a performance of the application in the computing environment under one or more different conditions;

select a plurality of different components utilizing at least the pattern;

select, for each of the plurality of different components, a chaos test template;

utilize the first configuration information to populate a plurality of different fields in the chaos test template to generate a first executable chaos test for the for the application executing in the computing environment;

execute the first executable chaos test in the computing environment to test a defined path in the computing environment for a particular point of failure; and generate, based on execution of the first executable chaos test, first chaos test output indicating whether a first behavior of the application at the particular point of failure is expected or not expected based on the first configuration information and the pattern used by the computing environment for executing the application.

* * * * *

UNITED STATES PATENT AND TRADEMARK OFFICE
CERTIFICATE OF CORRECTION

PATENT NO. : 12,353,318 B1  
APPLICATION NO. : 18/982417  
DATED : July 8, 2025  
INVENTOR(S) : Subhash Saxena et al.

Page 1 of 1

It is certified that error appears in the above-identified patent and that said Letters Patent is hereby corrected as shown below:

In the Claims

Claim 7:
Column 16, Line 8:
"(1) a domain name system (DNS) web service, (2) applica-"
Should read:
"(1) a domain name system (DNS) web service, (2) an applica-"

Claim 11:
Column 17, Line 13:
"eters that define an operation and/or performance of"
Should read:
"eters that define an operation and/or a performance of"

Signed and Sealed this
Twenty-first Day of October, 2025

John A. Squires
*Director of the United States Patent and Trademark Office*